J. F. LAVERY.
Sewer and Catch Basin.

No. 228,084.  Patented May 25, 1880.

Witnesses:
F. B. Townsend
Abigail A. Draper

Inventor:
John F. Lavery
per D. W. Le Conte
Attorney.

UNITED STATES PATENT OFFICE.

JOHN F. LAVERY, OF CHICAGO, ILLINOIS.

SEWER AND CATCH BASIN.

SPECIFICATION forming part of Letters Patent No. 228,084, dated May 25, 1880.

Application filed February 5, 1880.

*To all whom it may concern:*

Be it known that I, JOHN F. LAVERY, of the city of Chicago, in the county of Cook and State of Illinois, have invented certain Improvements in Sewer and Catch Basins, Water-Closets, and Privies, of which the following is a specification.

This invention relates to certain improvements in sewer-traps; and it has for its object to provide a trap or catch-basin by means of which the heavier or solid portions of sewage passing off from the basins, tubs, water-closets, and waste-conduits leading from a building or other place can be automatically separated from the lighter and liquid portions and conveniently removed from the trap, to provide for readily cleansing and flushing said trap when desired, and to permit the escape of noxious gases and prevent their access to the apartments or other portion of a building.

To this end the invention consists of an outer casing or receptacle provided with a removable top and an inner removable receptacle having perforated walls, the inner receptacle being connected with the waste-pipe leading from a water-closet, basin, bath-tub, or other source of sewage, and the outer vessel with conduits, one of which is in constant communication with the sewer by means of a suitable trap-pipe, and the other of which may be thrown into communication with the sewer by means of a suitable connection and valve having a valve-rod extending out of the outer vessel and suitably packed to prevent the escape of gas, the said outer vessel being provided with a ventilating-pipe leading to the open air for the escape of noxious gases, as more fully hereinafter specified.

Figure 1:
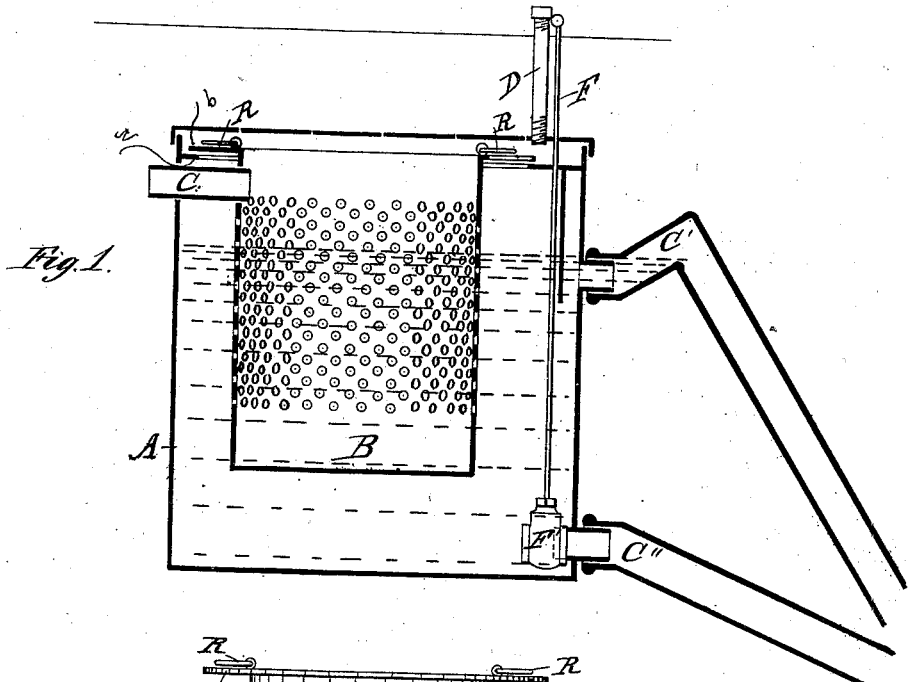
Figure 2:
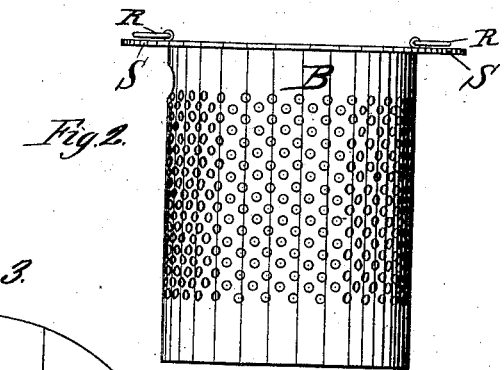
Figure 3:
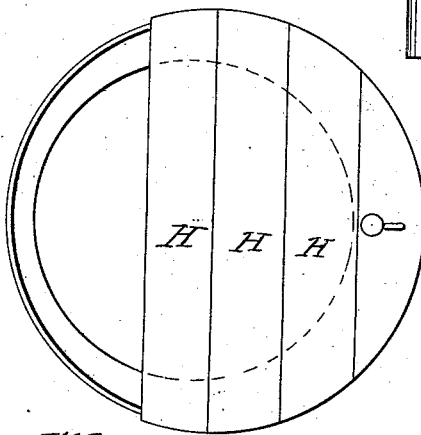
Figure 4:
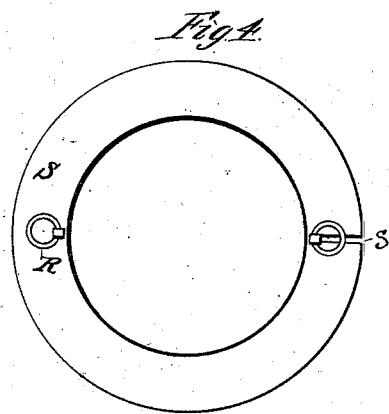

In the drawings, Figure 1 represents a vertical sectional view of my improved trap; Fig. 2, an elevation of the inner perforated casing; Fig. 3, a top view with a portion of the cover of the outer casing removed, and Fig. 4 a top view of the inner casing.

The letter A indicates the outer casing forming part of my improved trap, and B the inner casing thereof. The outer casing may be constructed of brick-work, suitably cemented to make it water-tight, or it may be made of metal, if preferred—such as galvanized iron, for instance.

Near the upper edge of said outer casing, on the inside, is formed an annular seat, *a*, upon which is adapted to rest the flange *b* of the inner vessel, B, in order to suspend said vessel within the outer casing, A.

The walls of the vessel B are perforated, as shown, beginning some distance above the bottom and extending upwardly, in order to form an impervious receptacle at the bottom for solid matters that may settle in said casing B.

The letter C indicates a pipe leading through the outer casing, A, to which it is permanently fastened by cement or otherwise to make a tight joint, and extending into the vessel B through a suitable aperture in one side of the same.

The letter R indicates two rings attached to the top of the casing B, by means of which it can be lifted out of the casing A when desired.

The letter C' indicates a trap-pipe leading from the upper part of the casing A to a sewer or main, and C'' a pipe leading from the lower part thereof to a main.

The connection leading into the pipe C'' at the lower part of the casing A is provided with a valve, F', from which extends a valve-rod, F, through a portion of the top of the other casing, which portion is made stationary in order not to interfere with the valve-rod in cleaning the trap.

The letter D indicates a ventilating-tube extending from the interior of the outer casing to the outer air through the stationary portion of the top of the said casing.

In order to permit the insertion and removal of the casing B without disturbing the inlet C, the said casing is made considerably less in diameter than the aperture at said seat, and the aperture is formed nearer to one side of the casing A than the other, so as to leave room for the casing to be shifted laterally after being inserted, so as to take or clear the end of the said tube and to permit the flange to move laterally. For this purpose it is slotted at its edge, as indicated by the letter *s*, so that it will clear the valve-rod F.

The top of the casing A is formed in sections H H H, all of which are removable for the purpose of reaching the interior of the trap, the other sections being stationary, for the purposes before mentioned.

The operation of my invention will be readily understood in connection with the above description.

The parts being in proper position, the sewage enters through C into the perforated casing B. Here all the larger or solid portions are retained, the lighter and liquid portions passing through the perforations into the casing A and out through the trap-pipe C'.

When it is desired to cleanse the trap the removable part of the cover is taken off, the vessel B and its contents removed, and the vessel A cleared and flushed by opening the valve F'. After this the parts are all placed together again as before, and the trap is ready for further operation.

What I claim, and desire to secure by Letters Patent, is—

1. In combination with the outer casing, the inner removable casing, provided with perforated walls, the conduit leading to said inner casing, and the waste-pipes leading from the outer casing to the sewer, the lower pipe being provided with a valve having a valve-stem, by which it may be operated from the outside, the whole arranged to operate substantially as and for the purposes specified.

2. In combination with the outer vessel, A, provided with seat $a$, the pipe C and inner casing, B, provided with flange $b$, slotted at $s$, whereby said inner vessel may be inserted and removed without disturbing pipe C, substantially as and for the purpose specified.

JOHN F. LAVERY.

Witnesses:
ABIGAIL A. DRAPER,
F. B. TOWNSEND.